Feb. 24, 1953 V. E. TAYLOR 2,629,192
AUTOMATIC VEHICLE OPERATED GATE
Filed April 21, 1949 4 Sheets-Sheet 1

Inventor
Victor E. Taylor
By *Clarence A. O'Brien and Harvey B. Jacobson*
Attorneys Feb. 24, 1953 V. E. TAYLOR 2,629,192
AUTOMATIC VEHICLE OPERATED GATE
Filed April 21, 1949 4 Sheets-Sheet 2
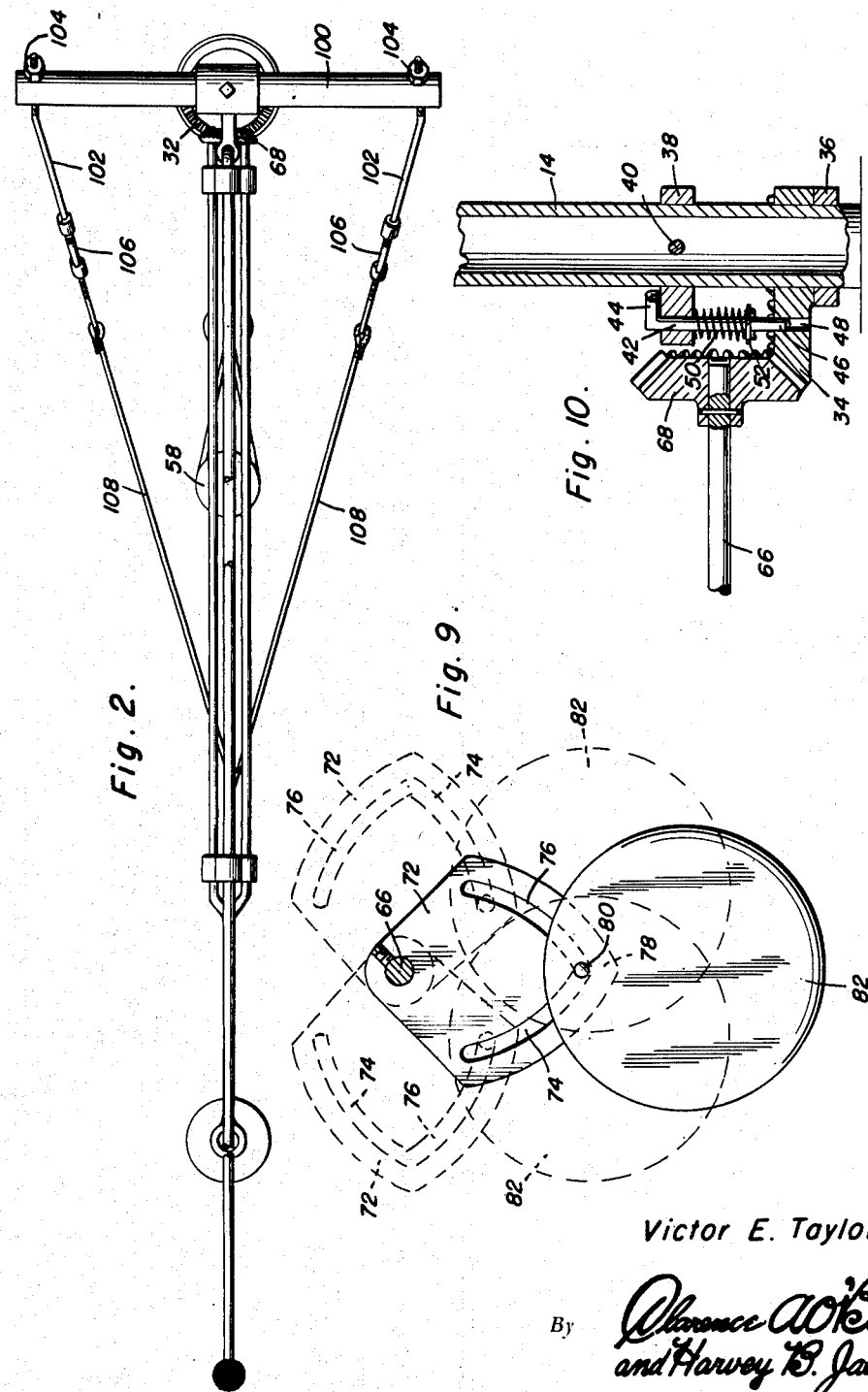
Inventor
Victor E. Taylor Feb. 24, 1953 V. E. TAYLOR 2,629,192
AUTOMATIC VEHICLE OPERATED GATE
Filed April 21, 1949 4 Sheets-Sheet 3
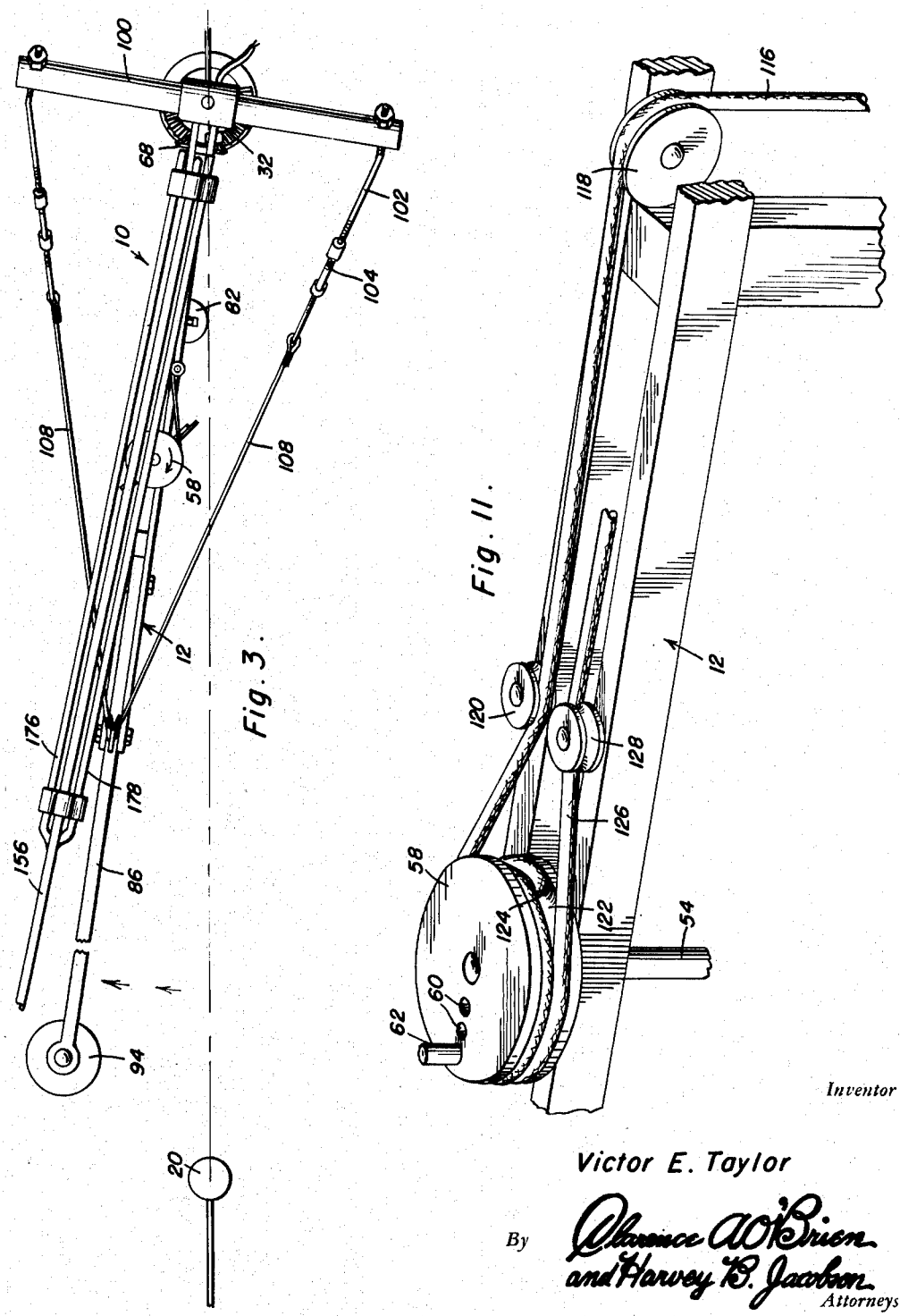
Inventor
Victor E. Taylor

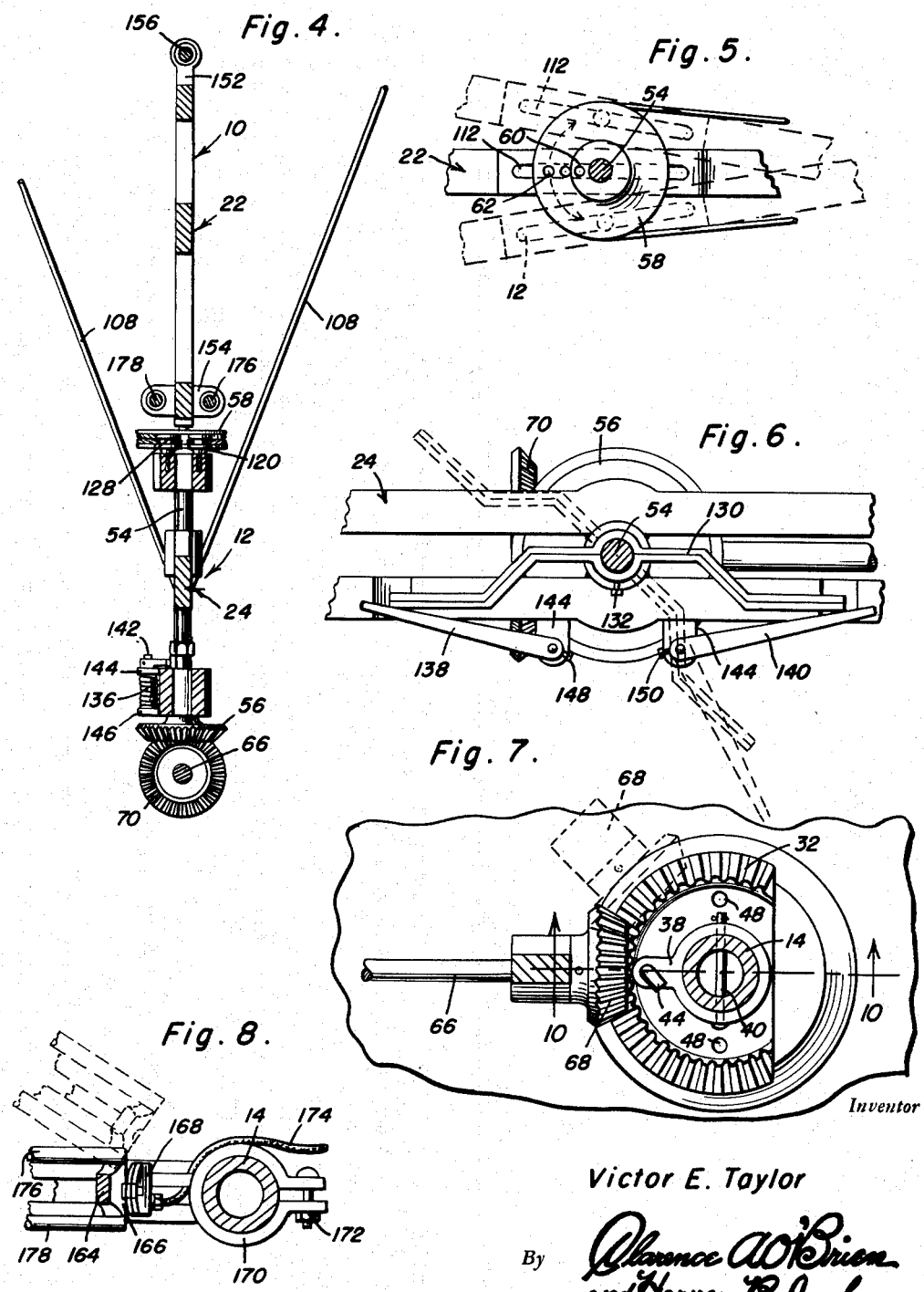

Patented Feb. 24, 1953

2,629,192

UNITED STATES PATENT OFFICE 2,629,192

AUTOMATIC VEHICLE OPERATED GATE

Victor E. Taylor, Nampa, Idaho, assignor of ten per cent to Jean A. Brown, Burlingame, Calif., and ten per cent to A. H. Whitlatch, Nampa, Idaho Application April 21, 1949, Serial No. 88,774

4 Claims. (Cl. 39—58)

1

This invention comprises novel and useful improvements in an automatic vehicle operated gate, and more specifically pertains to an improved gate construction and operating means for the same whereby the pressure of a vehicle thereagainst will expeditiously open the gate in an improved manner without the necessity of the personal attention of the operator of the vehicle for opening and closing the gate.

It is well known that the necessity for the operator of a vehicle such as a tractor, truck or automobile for dismounting from his vehicle, in order to open a gate for the passage of the vehicle and thereafter closing the gate again, represents a considerable inconvenience particularly in inclement weather as well as a loss of time. The disadvantages of this practice are also even more apparent when the gate forms part of an electrically charged fence for enclosing a range, retaining stock and the like.

While gates have been previously devised which are automatically opened by pressure of a vehicle thereagainst, such gates have been subject to the disadvantage that the pressure of the vehicle against the gate tends to cause possible damage to the vehicle as various parts of the same are pressed against different portions of the gate as the vehicle forces the gate to its open position. Further, such gates have been heretofore impractical for use in electrically charged fences.

It is therefore the primary object of the invention to provide a construction of automatic gate which may be operated by the vehicle to its open position, in an improved manner to eliminate all possibility of damage to the vehicle or its occupants during the opening movement; and which may thereafter be automatically returned to its closed position after passage of the vehicle; and wherein such gate may conveniently comprise a part of an electrically charged fence but whereby the gate may be disconnected from the electric circuit during its opening and closing movements.

An important feature of the invention resides in the provision of a gate having improved means whereby the same may be engaged by and operated to its opened position by the passage of a vehicle; together with automatic means for closing the gate after passage of the vehicle.

A further feature of the invention resides in the provision of a gate having separately rotatable upper and lower sections which are geared together so that one of these sections which is engaged by a vehicle may be caused to operate the other section at a greater rotational speed, to thereby prevent any possibility of the operated section contacting any part of the vehicle.

2

A still further feature of the invention resides in the provision of electrical conducting elements associated with the upper section of the gate and having an improved means for disconnecting these elements from the electric circuit upon actuation of the gates.

Yet another feature of the invention resides in the provision of an improved gearing assembly connecting the upper and lower sections, whereby the desired relative motion between the sections may be imparted.

Yet another additional feature of the invention resides in the provision of means for selectively locking the two gate sections together, whereby they may be operated as a unit either by the vehicle or manually if desired.

And a final important feature and object of the invention resides in the provision of various adjustment means for selectively positioning the vehicle engaging element of the gate; for adjusting the counterweight and closing mechanism of the gate; and for varying the relative extent of movement of one section of the gate with respect to the other section thereof.

These, together with various ancillary objects and features of the invention which will later become apparent as the following description proceeds, are attained by this invention, a preferred embodiment of which has been illustrated by way of example only in the accompanying drawings, wherein:

Figure 2 is a top plan view of the embodiment of Figure 1;

Figure 3 is a top plan view of the embodiment of Figure 1, the gate being shown in a partially open position;

Figure 4 is a vertical transverse sectional view taken substantially upon the plane of the section line 4—4 of Figure 1;

Figure 5 is an enlarged diagrammatic horizontal sectional view taken substantially upon the plane of the section line 5—5 of Figure 1 and illustrating the operation of the mechanism for imparting the relative movement to the two sections of the gate;

Figure 6 is an enlarged horizontal sectional detail view taken substantially upon the plane of the section line 6—6 of Figure 1 and illustrating a portion of the closing mechanism of the gate section;

Figure 7 is an enlarged horizontal sectional view taken substantially upon the plane of the section line 7—7 of Figure 1 and illustrating the driving gearing for imparting relative movement to the upper section upon operation of the lower section of the gate;

Figure 8 is an enlarged horizontal sectional view taken substantially upon the plane of the section line 8—8 of Figure 1 and illustrating the electric circuit switch for deenergizing the conductors of the upper section of the gate upon opening of the same;

Figure 9 is an enlarged vertical transverse sectional view taken substantially upon the plane of the section line 9—9 of Figure 1 and illustrating the operation of the counterweights;

Figure 10 is an enlarged vertical transverse sectional view taken substantially upon the plane of the section line 10—10 of Figure 7; and Figure 11 is an enlarged perspective view of a portion of the operating mechanism of the gate sections.

Figure 1:
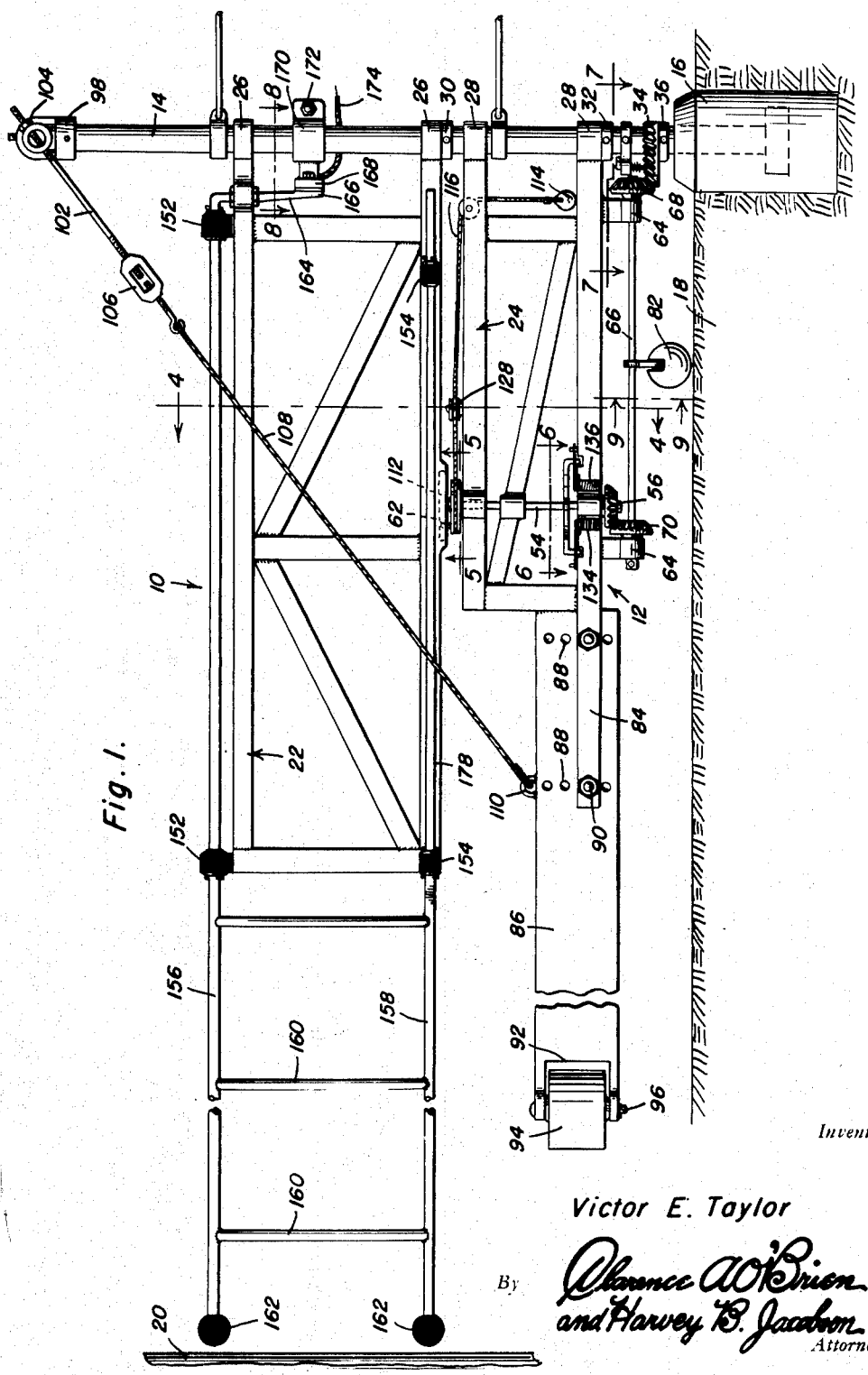
Figure 1 is an elevational view of a preferred embodiment of the invention, a part of the upper and lower sections of the gate being broken away, the gate being shown in its closed position.

Reference is now made more particularly to the accompanying drawings, wherein like numerals designate similar parts throughout the various views. As shown in Figure 1, the automatic gate forming the subject of this invention may conveniently comprise upper and lower gate sections 10 and 12 which are mounted cantilever fashion for rotation about a stationary standard or shaft 14 which may be of steel tubing or the like and which is fixedly supported as in a concrete anchor or the like 16 embedded in the ground 18.

It is intended that at least one of the gate sections, such as the upper section 10, shall be of sufficient length as to extend substantially across a thoroughfare, road or the like between the standard 14 and a stationary gate post 20, as also shown in Figure 3. It is to be noted that the standards 14 and 20 may conveniently constitute parts of a fence or wall, and if desired this fence or wall may be of various well known electrified types for retaining stock or the like.

The upper and lower gate sections 10 and 12 may conveniently comprise any suitable type of rectangular frames 22 and 24 which are provided with laterally or endwise extending trunnions or bearings 26 and 28 which are rotatably journaled upon the standard 14 and are retained in desired vertical position thereon as by adjustable collars or shoulders upon the standard, indicated at 30 and 32, respectively. It is to be noted that these collars may be appropriately spaced so as to position the sections 10 and 12 at any desired vertical spacing, both with respect to each other as well as with respect to the surface of the ground 18.

Likewise rotatably journaled upon the standard 14 at any suitable place, such as below the lower section 12, is a ring gear 34 of the bevel gear type, likewise supported in vertical position at any desired vertical level as by a collar or shoulder 36.

The gear 34 which is journaled upon the standard 14 for free rotation is normally retained in fixed position upon the shaft by an adjustable fastening means indicated best in Figures 7 and 10. This means comprises a plate or lug 38 fixedly secured to the shaft 14 as by a pin 40, which lug is provided with a bore receiving a bolt or pin 42 slidable therein, this pin being provided with a handle portion 44 and a lower locking extremity 46, adapted to be selectively inserted in one of a series of locking bores 48 disposed circumferentially about the gear 34. To retain the locking pin in its locked position, a compression spring 50 encircles the pin and is terminally abutted against the lower surface of the lug or plate 38, and upon any suitable form of spring retainer cap 52 detachably secured to the locking pin 42, so that the spring will urge the bolt downwardly into its engaged or locking position with the gear 34. Obviously, when the bolt is so positioned, the gear 34 will be fixedly secured to the shaft 14 and consequently will be held in a stationary position therewith; while when the pin is elevated, and its extremity 46 disengaged from the bore 48, the gear will be free to rotate about the shaft 14 for a purpose which will be later apparent.

The lower gate section has journaled thereon a vertical shaft 54 which, at its lower extremity underneath the section 12, is provided with a bevel gear 56, while above the section 12 it is provided with a driving pulley 58, see Figure 11, having a plurality of radially spaced bores 60 for selectively receiving a crank pin 62 extending upwardly therefrom. Journaled in suitable bearings 64 depending from the section 12 is a horizontally disposed shaft 66 which is provided with a bevel gear 68 constantly in mesh with the gear 34, and a further bevel gear 70 continuously engaged with the gear 56. Any desired gear ratios may be employed for this gear train, although, as illustrated, the gears 56, 70 and 68 are equal, while the gear 34 is of twice their diameters. As so far described, it will be seen that when the lower section 12 is swung to the closed position about the vertical axis of the support shaft 14, the gear 68 will be rotated about the stationary gear 34, thus imparting rotation to the shaft 66 and a consequent rotation to the vertical shaft 54. The latter, through the pin 62, is connected to the upper section 10 whereby, when the lower section, which may be termed the driving section of the gate, is rotated, the upper section which may be termed the driven section of the gate will be moved in the same direction but at a greater rate of speed.

It is intended that the driving section shall be engaged by a vehicle and urged to gate-opening position, and this movement of the driving section will, through the above mentioned gearing, result in an amplified movement of the upper section in the same direction. By this means, any danger of the upper section touching any part of the vehicle during its opening movement will be eliminated, since the lower section which may be engaged by the fenders or bumper of the vehicle will be actuated first, and the faster moving upper section will increase its clearance of the vehicle.

The lower section 12 and, through the interconnection to be hereinafter described, the entire gate assembly are urged to their closed position with respect to the gate post 20 and to each other by a counterweight, whose construction and operation is depicted more clearly in Figure 9, which is rigidly attached to the shaft 66. For this purpose, the shaft 66 is provided with a plate 72 which may be clamped to the shaft, rigidly attached by a set screw or fastened immovably in any other desired manner. This plate is provided with a pair of intersecting curved grooves or slots 74 and 76 which intersect adjacent the lower edge of the plate 78 which is intended to be vertically beneath the shaft 66 when the gate sections are in their closed position. These grooves 76 are curved upwardly from their place of intersection adjacent the lower end of the plate 78 inwardly toward the shaft 66, and a pin 80 is freely slidable in the grooves or slots, and is received in a bifurcated portion of a counterweight 82. The arrangement is such that when the gate is opened in either direction, the rotation of the shaft 66 will cause a corresponding rotation of the plate 72 fixed thereto, thereby causing movement of the pin 80 through one of the slots 74 or 76, thereby elevating the counterweight. These various positions of the counterweight during either direction of movement of the gate are indicated in dotted lines in Figure 9. Obviously, as soon as the gate is freed from the opening force, the counterweight, acting through its lever arm of the plate 72 upon the shaft 66, will cause rotation of the latter, and through the gearing assembly will cause closing or returning of the gate sections to their original closed position. Obviously, various constructions of counterweights may be employed, and their placing as well as their size will vary with the physical characteristics of the gate and of the environment in which the gate is employed.

Extending outwardly from the lower section 12 is an extension 84 to which is adjustably fastened a push plate 86 of any desired construction. The latter is preferably provided with series of vertically spaced apertures 88 by means of which the plate 86 may be vertically adjusted upon the extension 84 as by means of bolts or the like 90. At its outer extremity, the plate 86 is preferably provided with a notched portion 92 in which a buffer roller 94 of any suitable cushioning material, which may be rubber or rubber coated, is journaled as upon a shaft or axle 96. By this means, a vehicle fender or bumper pressing against the pusher plate 86 will rotate the section 12, and as the vehicle passes through the open gate, the roller 94 will rest against the bumper or fenders, move across the same without scratching or scarring them, and pass along the side of the vehicle, likewise without damage.

As shown more clearly in Figure 2, a reinforcing or brace means is provided to assist in supporting and strengthening the cantilever lower section of the gate. For this purpose, the standard 14 is provided adjacent its top with a collar or shoulder 98, upon which rests and is supported a transversely extending arm 100 which is rotatable upon the standard 14. A pair of stays 102 are positioned in apertures at the extremities of the arm 100 and are adjustably retained therein as by screw-threaded adjusting nuts 104. At their other ends, the stays 102 are provided with turnbuckles 106 by means of which guy wires 108 having their lower extremities secured to an eye-bolt 110 conveniently attached to the pusher plate 86, may be adjustably tensioned. It will thus be seen that as the lower gate section is rotated, its guy wires 108 and the transverse bar 100 will be rotated therewith, thus forming a rigidly braced assembly.

Conveniently positioned upon the upper frame or section 10 is a longitudinally extending channel or slot 112, see Figure 5, in which is received the above mentioned driving pin 62 forming a crank throw upon the pulley 58.

Thus, as the shaft 54 is rotated, the crank throw 62 will likewise rotate, and during its longitudinal travel in the slot or channel 112, will rotate the upper section 10 relative to the lower section 12. By disposing the pin in the various bores 60, the relative amplitude of movement of the upper section with respect to the lower section will be varied, as will be seen from Figures 5 and 11.

A further counterweight system is provided in connection with the shaft 54 for biasing the upper section 10 into its normally vertically aligned position with respect to the lower section and for biasing both said sections into their closed positions. This counterweight system consists of a weight, a conventional spring (not shown) or the like indicated at 114 and attached to one extremity of a cable 116 which is entrained over a guide pulley 118 mounted upon the rectangular frame 24 of the lower section 12. The cable passes from the pulley 118 over a further guide pulley 120 and thence, being wound about the groove 122 in the pulley 58, has its extremity secured in an aperture 124 in the pulley. A similar cable 126 is likewise secured in the aperture 124 or in a further aperture not shown, is wound about the groove 122 of the pulley, entrained over the idler or guide pulley 128, and thence over a further guide pulley, not shown, but similar and parallel to the pulley 118, from whence it is likewise attached to a weight, not shown. This arrangement is such that the weights and cables urge the pulley 58 to its normal position shown in Figure 11, whereby the gate sections will be in vertical alignment with each other and the gate will be closed. When now the shaft 54 is rotated, one counterweight will be elevated, thus imparting a biasing torque to the shaft 54, so that when the opening pressure on the gate is released, this torque will return the shaft 54 and the gate sections to their original positions.

An additional means is provided for yieldingly urging the gate sections into their vertically aligned position. This means comprises a lever arm 130 fixedly secured to the vertical shaft 54 as by a set screw 132, see Figure 6, which lever is normally disposed in parallel relation to the rectangular frame 24. Secured to this frame are a pair of coiled torsion springs 134 and 136, which carry rigid levers 138 and 140, respectively, bearing upon the opposite extremities of the arm 130. When the arm 130 is in its above mentioned parallel relation, which is the normal position when the gate sections are in vertical alignment, the forces exerted by the coil springs are equal. However, when the upper section is rotated in either direction with respect to the lower section, thereby resulting in a corresponding rotation of the shaft 54 and the arm 130, one of the coil springs, through its lever 138 or 140 is tensioned. Therefore, when the force opening the gate is released, this tension is effective to urge the lever 130 into a position to restore the parts to their normal relation.

As suggested more particularly in Figure 4, the coil springs 134 and 136 may be disposed about vertical supporting shafts 142, which shafts and springs are positioned between upper and lower lugs 144 and 146 extending laterally from the lower member of the rectangular frame 24. Either extremity of the coil spring 134 or 136 may be rigidly attached to the shaft 142, with the other extremity anchored to one of the lugs 144 or 146, whereby the shafts 142 may be spring loaded. The above mentioned levers 138 and 140 are fixedly secured upon the upper end of the shafts 142 as by set screws 148 and 150, respectively, these levers being positioned above and resting upon the upper lug 144. Attention is now directed more particularly to the upper section 10 which may comprise a gate closure section, but preferably is also provided with electrical conductors whereby the gate may be electrified.

For this purpose, the upper and lower horizontally extending portions of the frame 22 of the upper section 10 are provided with insulating supports 152 and 154 by means of which an electrically conductive frame consisting of upper and lower electric conducting members of a rigid nature 156 and 158 may be mounted upon the frame 22. At their outer ends the members 156 and 158 may be provided with a plurality of reinforcing braces or connectors 160, and at their extremities may be provided with insulating knobs 162 in the form of rubber or other dielectric spheres having sockets by means of which they may be retained upon the members 156 and 158.

These knobs prevent the accidental contact of the vehicle or the operator with the electrified conductors 156 and 158. One of the conductors, such as that indicated 156, is provided with a downwardly extending member 164, see also Figure 8, whose lower extremity terminates in a laterally extending electric switch contact block 166. The latter is adapted to resiliently abut a fixed switch contact block 168 insulatingly mounted upon and carried by a bracket 170 which is clamped upon the shaft 14 as by a clamping bolt 172. Either the end of the arm 164, the fixed block 168 or its supporting member by which it is mounted upon the bracket 170 may be of a resilient nature to effect a resilient, and positive electric contact between the terminals 166 and 168. Electric current is conducted from any suitable source as through an electric cable 174 to the fixed contact, from thence to the movable contact, and so through the electric conductors whereby the gate may be charged.

The upper rod 156 of the conducting frame being disposed above the gate may be mounted substantially over the center of the gate; but the lower member 158 is preferably bifurcated to provide a pair of rods 176 and 178 which are disposed on opposite sides of the lower portion of the rectangular frame 22.

It will now be seen that as soon as the upper section 22 begins to move from its closed position, the movable contact 166 will disengage the fixed contact 168, whereby the source of current through the conductor 174 will be disconnected from the conductors of the gate until such time as the gate returns to its closed position. This substantially eliminates any danger of applying the charging current of the fence or gate accidentally to the vehicle or the occupants thereof.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. An automatic vehicle operated gate comprising a gate support, a pair of vertically spaced gate sections each journaled on said support for rotation about a vertical axis, one of said sections having a laterally extending pusher plate for engagement by a vehicle, means connecting said other section to said one section for causing swinging movement of the former in response to movement of the latter by a vehicle actuating said pusher plate, said connecting means including a shaft journaled on said one section, an operating connection between said shaft and said other section and means for driving said shaft in response to movement of said one section.

2. The combination of claim 1 wherein said driving means comprises a gear mounted on said gate support, said shaft being operatively connected to said gear.

3. The combination of claim 2 including means for selective locking of said gear against rotation on said support and releasing said gear for rotation.

4. An automatic vehicle operated gate assembly comprising a gate support, a gate journaled thereon for rotation about a vertical axis, elongated electric conductors carried by said gate and having each an outer end, a stationary switch member carried by said support and connected with a source of electric current, a movable switch member connected to said conductors and mounted on said gate for making electric contact with said stationary switch member when said gate is closed and breaking electrical contact therewith when said gate is moved from closed position, said gate including a pusher plate extending laterally for engagement by a vehicle, insulating knobs on the outer ends of said conductors, the latter extending laterally from said gate, said outer ends of said conductors being disposed above and extending outwardly beyond said pusher plate.

VICTOR E. TAYLOR.

REFERENCES CITED

The following references are of record in the file of this patent:

UNITED STATES PATENTS

| Number | Name | Date |
|---|---|---|
| 225,841 | Luce | Mar. 23, 1880 |
| 343,939 | Wilson | June 15, 1886 |
| 505,390 | Caraway | Sept. 19, 1893 |
| 986,574 | Jones | Mar. 14, 1911 |
| 1,331,836 | Wilbanks | Feb. 24, 1920 |
| 1,441,116 | Rollman | Jan. 2, 1923 |
| 1,851,968 | Classen | Apr. 5, 1932 |
| 2,023,835 | Heiken | Dec. 10, 1935 |
| 2,076,092 | Pinard | Apr. 6, 1937 |
| 2,086,061 | Barr | July 6, 1937 |
| 2,118,722 | Bock | May 24, 1938 |
| 2,144,896 | Raymond | Jan. 24, 1939 |
| 2,273,690 | Bowers | Feb. 17, 1942 |
| 2,306,661 | Gengler | Dec. 29, 1942 |
| 2,516,073 | Puett | July 18, 1950 |
| 2,538,470 | Peeples | Jan. 16, 1951 |
| 2,540,562 | Wood | Feb. 6, 1951 |